(12) United States Patent
Kutz et al.

(10) Patent No.: US 12,388,478 B2
(45) Date of Patent: Aug. 12, 2025

(54) TECHNIQUES FOR COMBINED DIGITAL PRE-DISTORTION WITH OVER-THE-AIR SIGNALING

(71) Applicant: QUALCOMM Incorporated, San Diego, CA (US)

(72) Inventors: Gideon Shlomo Kutz, Ramat Hasharon (IL); Amit Bar-Or Tillinger, Tel-Aviv (IL); Tal Oved, Modiin (IL); Elad Meir, Ramat Gan (IL); Ram Krips, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 17/932,516

(22) Filed: Sep. 15, 2022

(65) Prior Publication Data

US 2024/0097722 A1    Mar. 21, 2024

(51) Int. Cl.
*H04L 5/00* (2006.01)
*H04B 1/04* (2006.01)

(52) U.S. Cl.
CPC ......... *H04B 1/0475* (2013.01); *H04L 5/0048* (2013.01); *H04L 5/0092* (2013.01); *H04B 2001/0425* (2013.01)

(58) Field of Classification Search
CPC .......... H04B 1/0475; H04B 2001/0425; H04L 5/0048; H04L 5/0092
See application file for complete search history.

(56) References Cited

U.S. PATENT DOCUMENTS

| 11,290,138 B1 * | 3/2022 | Kutz | H04B 1/0475 |
| 2022/0217017 A1 | 7/2022 | Zach et al. | |
| 2023/0014042 A1 * | 1/2023 | Barak | H04L 5/0048 |

FOREIGN PATENT DOCUMENTS

| WO | WO-2022047764 A1 | 3/2022 |
| WO | WO-2022126307 A1 | 6/2022 |

OTHER PUBLICATIONS

International Search Report and Written Opinion—PCT/US2023/072634—ISA/EPO—Nov. 15, 2023.

* cited by examiner

*Primary Examiner* — Siu M Lee
(74) *Attorney, Agent, or Firm* — Dalei Dong; Harrity & Harrity, LLP

(57) ABSTRACT

Various aspects of the present disclosure generally relate to wireless communication. In some aspects, an UE may receive an indication of a configuration for receiving reference signals (RSs) and for transmitting a digital pre-distortion (DPD) measurement. The UE may receive the RSs from a network node. The UE may transmit a first signal that indicates the DPD measurement as observed via the RSs at the first UE, the first signal configured for coherent combination over the air with a second signal that indicates a DPD measurement as observed via the RSs at a second UE, the first signal and the second signal scheduled for transmission via overlapping network resources. Numerous other aspects are described.

30 Claims, 11 Drawing Sheets

TECHNIQUES FOR COMBINED DIGITAL PRE-DISTORTION WITH OVER-THE-AIR SIGNALING

FIELD OF THE DISCLOSURE

Aspects of the present disclosure generally relate to wireless communication and to techniques and apparatuses for techniques for combined digital pre-distortion with over-the-air signaling.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a first user equipment (UE). The method may include receiving an indication of a configuration for receiving reference signals (RSs) and for transmitting a digital pre-distortion (DPD) measurement. The method may include receiving the RSs from a network node. The method may include transmitting a first signal that indicates the DPD measurement as observed via the RSs at the first UE, the first signal configured for coherent combination over the air (OTA) with a second signal that indicates a DPD measurement as observed via the RSs at a second UE, the first signal and the second signal scheduled for transmission via overlapping network resources.

Some aspects described herein relate to a method of wireless communication performed by a network node. The method may include transmitting, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs. The method may include transmitting the RSs to the multiple UEs. The method may include receiving the signal as a coherently combined signal that indicates the DPD measurement as observed at the multiple UEs.

Some aspects described herein relate to a first UE for wireless communication. The first user equipment may include a memory and one or more processors coupled to the memory. The one or more processors may be configured to receive an indication of a configuration for receiving RSs and for transmitting a DPD measurement. The one or more processors may be configured to receive the RSs from a network node. The one or more processors may be configured to transmit a first signal that indicates the DPD measurement as observed via the RSs at the first UE, the first signal configured for coherent combination OTA with a second signal that indicates a DPD measurement as observed via the RSs at a second UE, the first signal and the second signal scheduled for transmission via overlapping network resources.

Some aspects described herein relate to a network node for wireless communication. The network node may include a memory and one or more processors coupled to the memory. The one or more processors may be configured to transmit, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs. The one or more processors may be configured to transmit the RSs to the multiple UEs. The one or more processors may be configured to receive the signal as a coherently combined signal that indicates the DPD measurement as observed at the multiple UEs.

Some aspects described herein relate to a non-transitory computer-readable medium that stores a set of instructions for wireless communication by a first UE. The set of instructions, when executed by one or more processors of the UE, may cause the UE to receive an indication of a configuration for receiving RSs and for transmitting a DPD measurement. The set of instructions, when executed by one or more processors of the UE, may cause the UE to receive the RSs from a network node. The set of instructions, when executed by one or more processors of the UE, may cause the UE to transmit a first signal that indicates the DPD measurement as observed via the RSs at the first UE, the first signal configured for coherent combination OTA with a second signal that indicates a DPD measurement as observed via the RSs at a second UE, the first signal and the second signal scheduled for transmission via overlapping network resources.

Some aspects described herein relate to a non-transitory computer-readable medium that stores a set of instructions for wireless communication by a network node. The set of instructions, when executed by one or more processors of the network node, may cause the network node to transmit, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs. The set of instructions, when executed by one or more processors of the network node, may cause the network node to transmit the RSs to the multiple UEs. The set of instructions, when executed by one or more processors of the network node, may cause the network node to receive the signal as a coherently combined signal that indicates the DPD measurement as observed at the multiple UEs.

Some aspects described herein relate to a first apparatus for wireless communication. The first apparatus may include means for receiving an indication of a configuration for receiving RSs and for transmitting a DPD measurement. The first apparatus may include means for receiving the RSs from a network node. The first apparatus may include means for transmitting a first signal that indicates the DPD measurement as observed via the RSs at the first apparatus, the first signal configured for coherent combination OTA with a second signal that indicates a DPD measurement as observed via the RSs at a second apparatus, the first signal and the second signal scheduled for transmission via overlapping network resources.

Some aspects described herein relate to an apparatus for wireless communication. The apparatus may include means for transmitting, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs. The apparatus may include means for transmitting the RSs to the multiple UEs. The apparatus may include means for receiving the signal as a coherently combined signal that indicates the DPD measurement as observed at the multiple UEs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
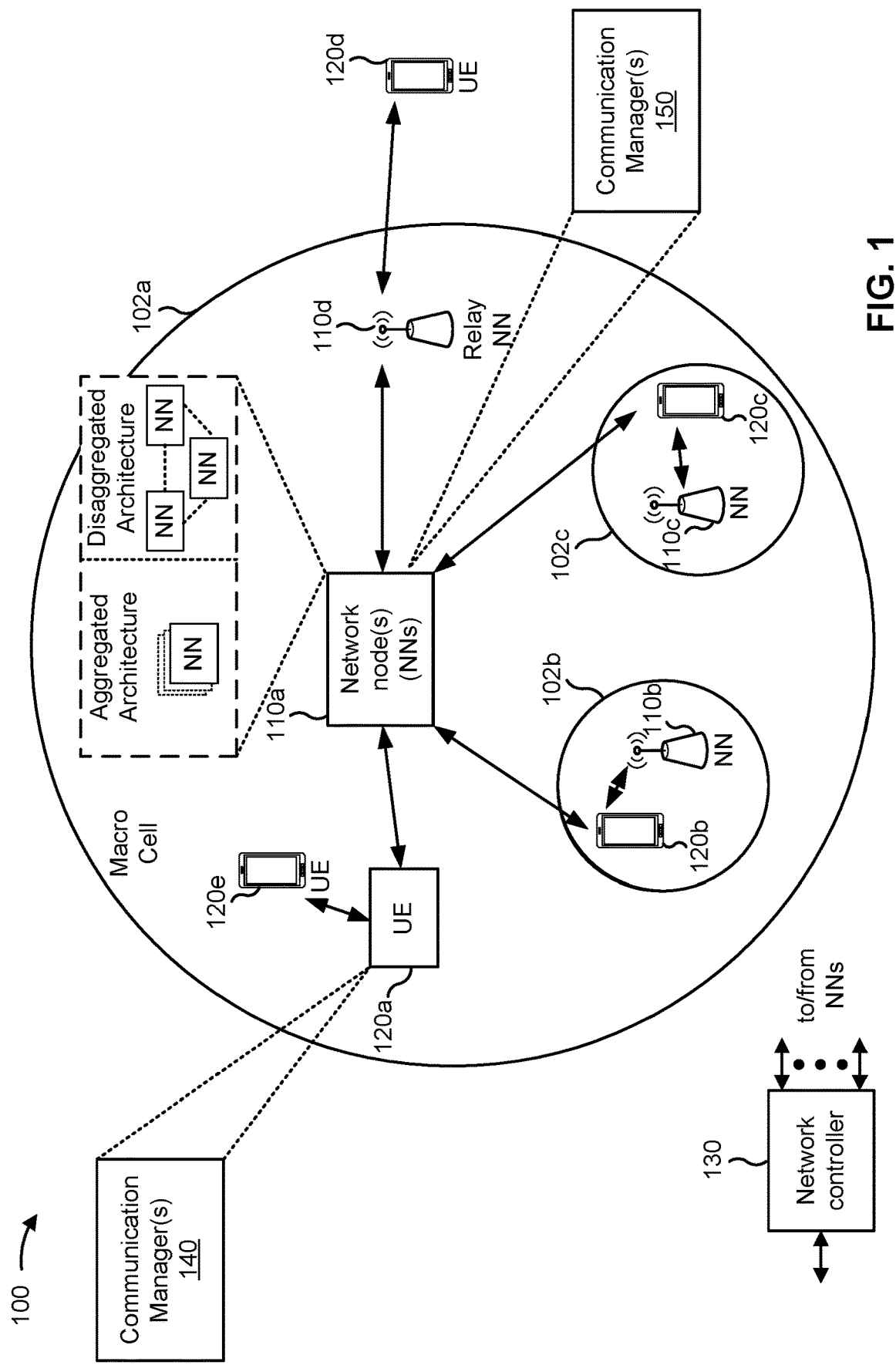
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an indication of a configuration for receiving reference signals (RSs) and for transmitting a digital pre-distortion (DPD) measurement; receive the RSs from a network node; and transmit a first signal that indicates the DPD measurement as observed via the RSs at the first UE, the first signal configured for coherent combination over the air (OTA) with a second signal that indicates a DPD measurement as observed via the RSs at a second UE, the first signal and the second signal scheduled for transmission via overlapping network resources. Additionally, or alternatively, the communication manager 140 may perform one or more other operations described herein.

In some aspects, the network node 110 may include a communication manager 150. As described in more detail elsewhere herein, the communication manager 150 may transmit, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs; transmit the RSs to the multiple UEs; and receive the signal as a coherently combined signal that indicates the DPD measurement as observed at the multiple UEs. Additionally, or alternatively, the communication manager 150 may perform one or more other operations described herein.

As indicated above, FIG. 1 is provided as an example. Other examples may differ from what is described with regard to FIG. 1.

Figure 2:
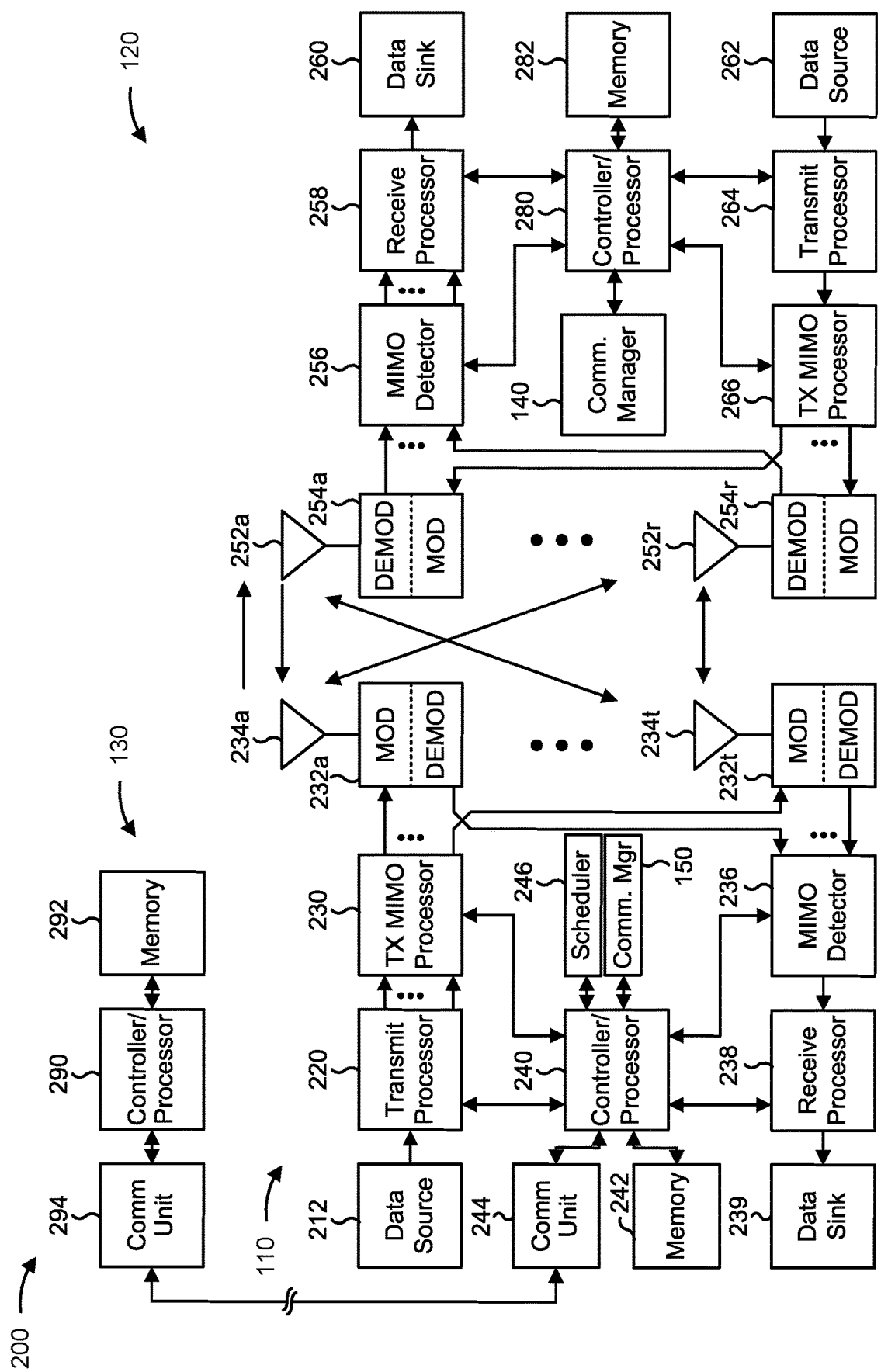
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 6-11).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 6-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with combined DPD with OTA signaling, as described in more detail elsewhere herein. For example, the controller/processor 240 of the network node 110, the controller/processor 280 of the UE 120, or any other component(s) (or combinations of components) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the first UE includes means for receiving an indication of a configuration for receiving RSs and for transmitting an indication of a DPD measurement; means for receiving the RSs from a network node; and/or means for transmitting a first signal that indicates the DPD measurement as observed via the RSs at the first UE, the first signal configured for coherent combination OTA with a second signal that indicates a DPD measurement as observed via the RSs at a second UE, the first signal and the second signal scheduled for transmission via overlapping network resources. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs; means for transmitting the RSs to the multiple UEs; and/or means for receiving the signal as a coherently combined signal that indicates the DPD measurement as observed at the multiple UEs. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
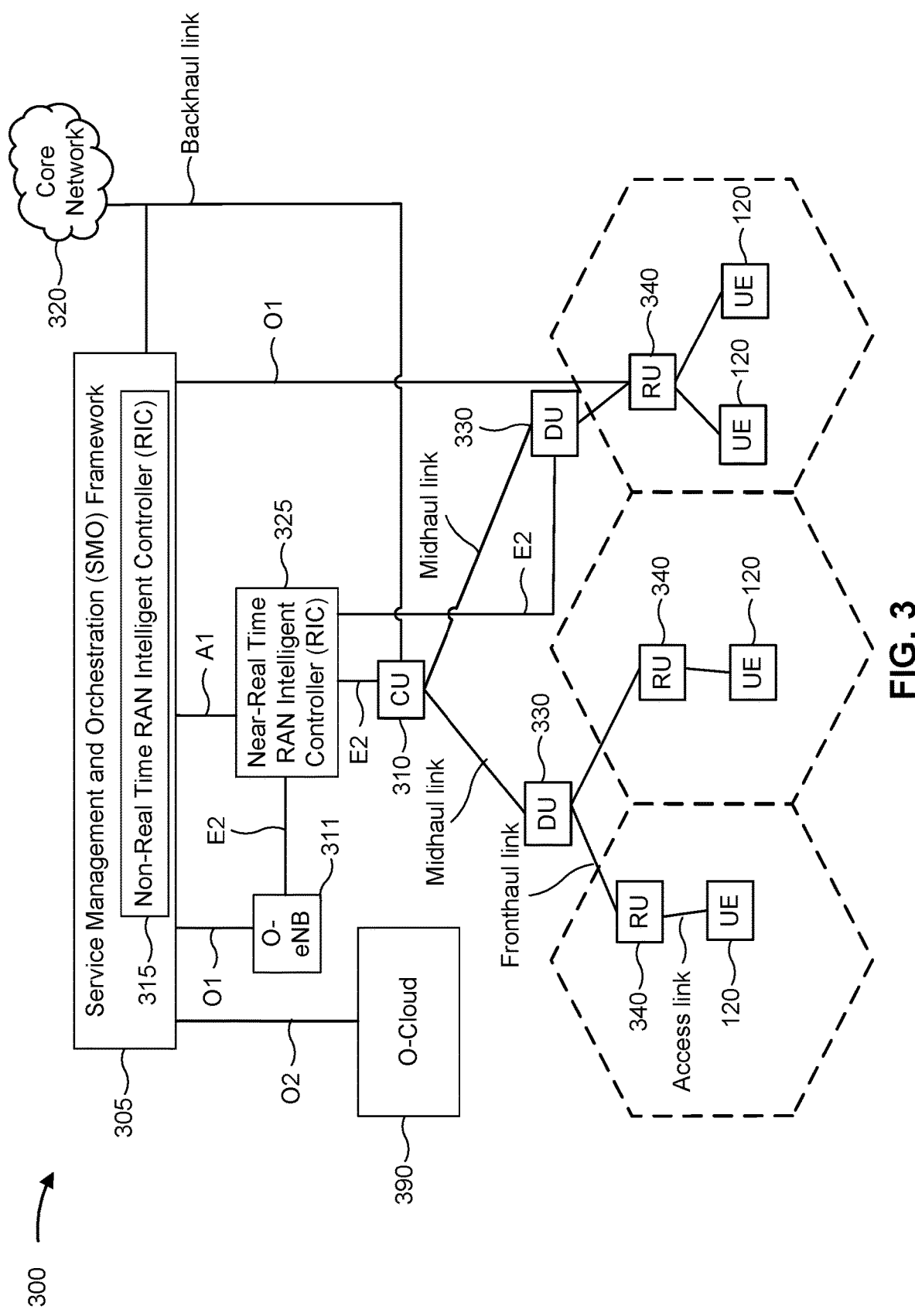
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle OTA communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
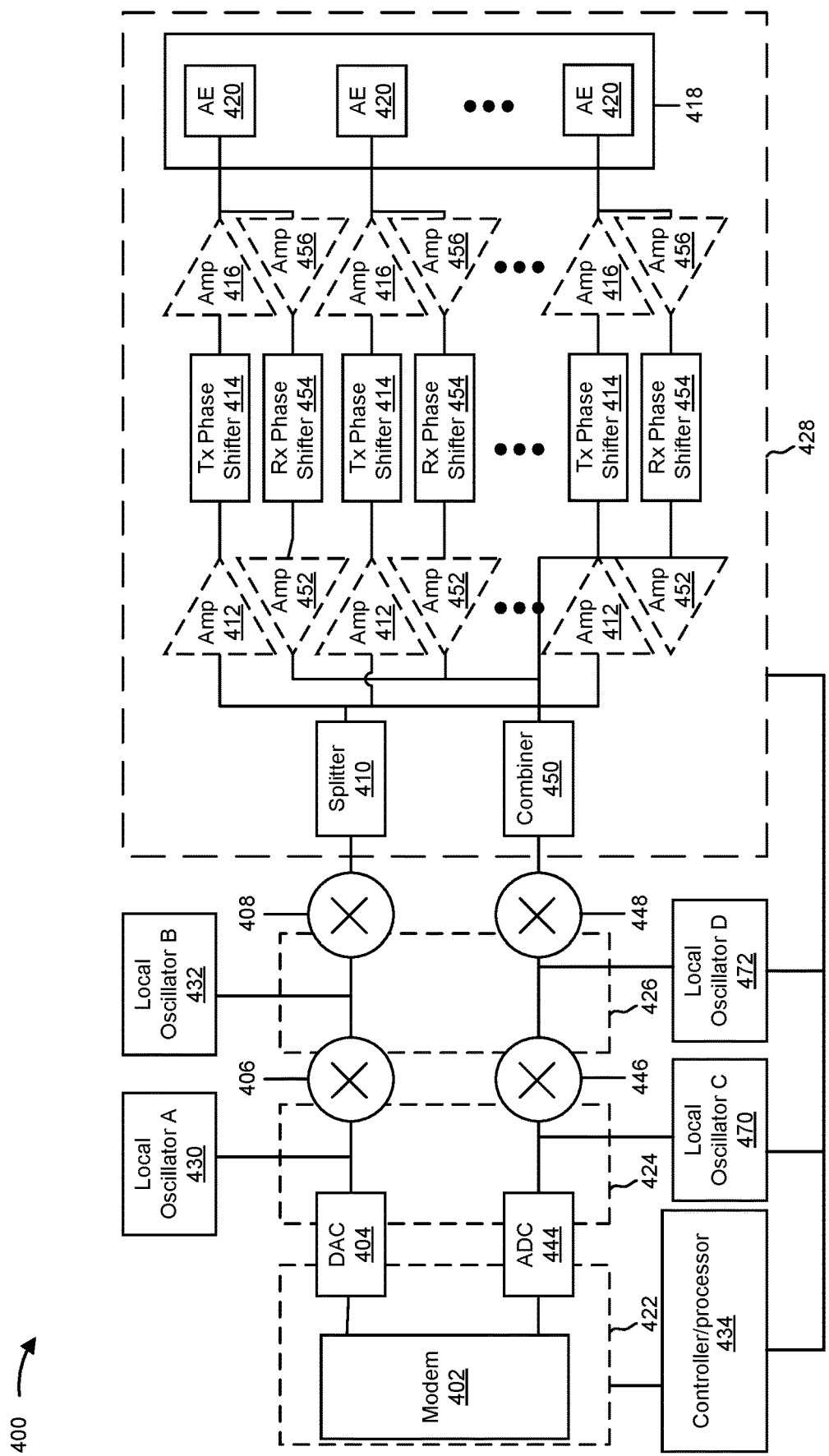
FIG. 4 is a diagram illustrating an example beamforming architecture that supports beamforming for millimeter wave (mmW) communications, in accordance with the present disclosure

FIG. 4 is a diagram illustrating an example beamforming architecture 400 that supports beamforming for millimeter wave (mmW) communications, in accordance with the present disclosure. In some aspects, architecture 400 may implement some aspects of wireless network 100. In some aspects, architecture 400 may be implemented in a transmitting device (e.g., a first wireless communication device, UE, or network node) and/or a receiving device (e.g., a second wireless communication device, UE, or network node), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a controller/processor 434. In some aspects, controller/processor 434 corresponds to controller/processor 240 of the network node 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

DPD is a technique to increase linearity or compensate for non-linearity in power amplifiers. In DPD, an output signal of a power amplifier may be pre-distorted using a non-linearity model associated with the power amplifier. The output signal of the power amplifier may be pre-distorted using the non-linearity model in order to compensate for non-linearities of the power amplifier. DPD may enable activating the power amplifier closer to its saturation point while maintaining a favorable linearity for the power amplifier. DPD may increase a power efficiency of the power amplifier, which may result in power savings at a network node.

DPD may apply inverse distortion, using a pre-distorter, at an input signal of the power amplifier to cancel distortion generated by the power amplifier. A signal $V_1$ may be provided as an input to the pre-distorter, and the pre-distorter may generate a signal $V_2$ as an output. In other words, the signal $V_1$ may be pre-distorted into signal $V_2$. The signal $V_2$ may be an input to the power amplifier, which may produce signal $V_0$ as an output, where signal $V_0$ may be an amplified version of signal $V_1$. The inverse distortion may be based at least in part on various characteristics of the power amplifier.

A network node (e.g., a transmitter) may include non-linear components, such as the power amplifier, which may distort transmitted signals. Non-linear distortions may be in-band distortions, which may affect a link performance, or out-band distortions, which may dictate an amount of adjacent channel interference. In order to avoid such distortions, power backoff may be used. When the power backoff is high, a power efficiency may be reduced, and signals may be transmitted with less power.

The network node may implement DPD as an alternative to, or in addition to, power backoff. With DPD, an amount of distortion may be kept at some target level, while the power backoff may be reduced to be as low as possible, which may improve the power amplifier efficiency. DPD operations may involve signal sensing at an RF circuit. A transmitted signal, from the power amplifier may be received, by a UE (e.g., a receiver), and the transmitted signal may be measured for non-linearities estimation by the UE.

The UE may receive a signal from the network node, and the UE may perform OTA measurements and feedback of non-linearities of the power amplifier based at least in part on the signal. The UE may measure and estimate a non-linear model of the power amplifier in the network node. The UE may transmit, to the network node, a report that indicates measurements and/or estimations of the non-linear model of the power amplifier in the network node. Based at least in part on the report, the network node may perform DPD to a signal before the signal is amplified by the power amplifier, which may enable a smaller power backoff of the signal before the signal is provided to the power amplifier. A power efficiency of the power amplifier may be increased, and as a result, the UE may transmit stronger downlink signals to achieve better coverage and/or reduce an amount of power being supplied to the power amplifier, which may result in reduced energy consumption.

DPD feedback is an effective way to receive information associated with PA non-linearities. However, DPD operations may require coupling a transmission output to a reception feedback chain to capture PA non-linearity, estimate the PA non-linearity, and/or correct the PA non-linearity. This works well when small number of antennas are used for transmission (e.g., in FR1, FR2, and/or sub6 networks).

However, when a large number of antennas are used for transmission, coupling the transmission output to the reception feedback per PA may consume a prohibitive amount of network resources. For example, in a millimeter wave bands, a relatively large number of antennas and PAs are used for transmission, which may require an unacceptable amount of network resources to receive the feedback per PA. Additionally, or alternatively, for millimeter waves, DPD should capture distortions on a far field beam and not per individual PA in order to account for cross coupling PA NL effects. These effects are not seen in transmission coupling feedback.

Figure 5:
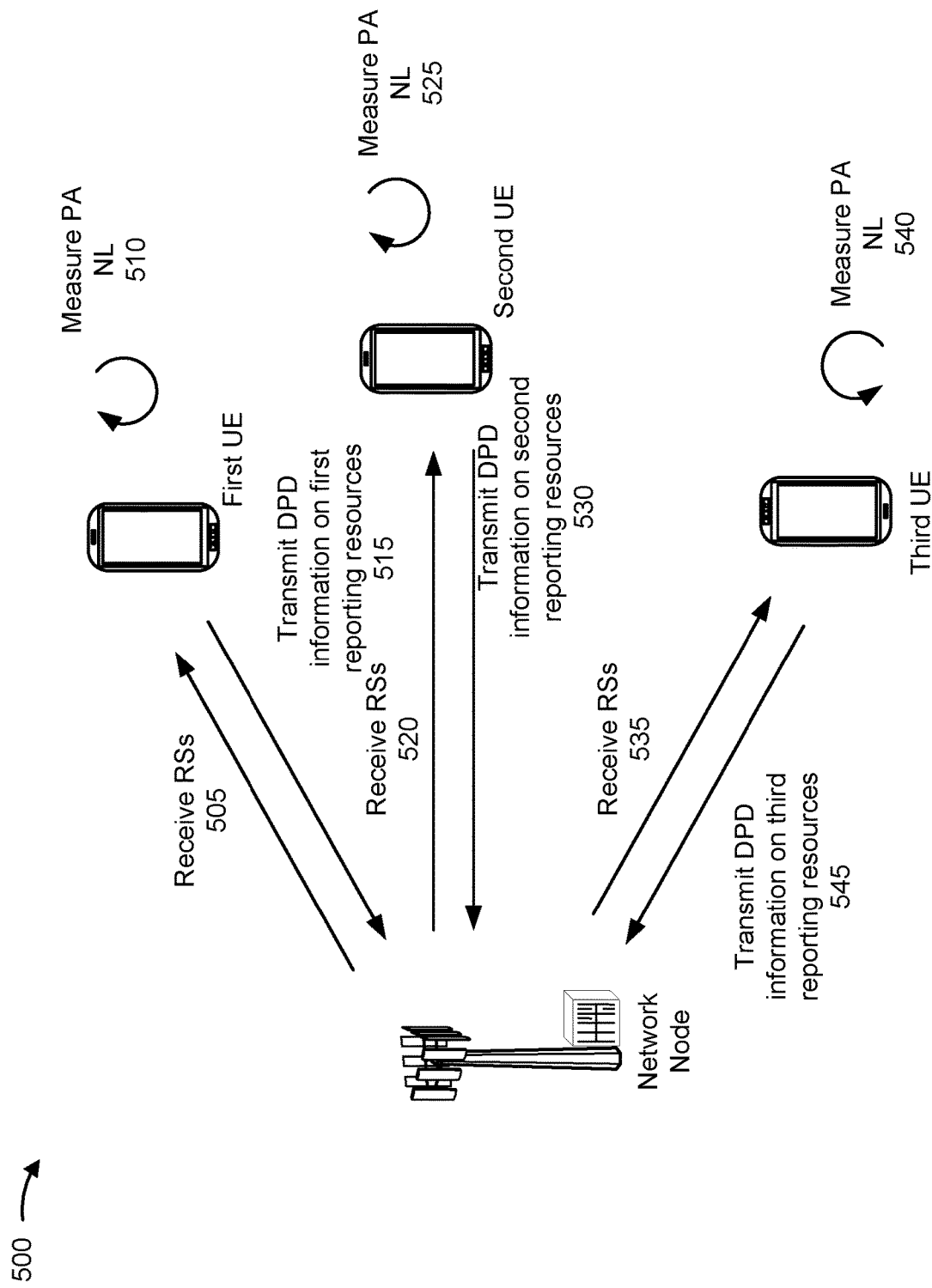
FIG. 5 is a diagram illustrating an example of federated digital pre-distortion (DPD) with over-the-air (OTA) signaling, in accordance with the present disclosure.

FIG. 5 is a diagram illustrating an example 500 of federated DPD with OTA signaling, in accordance with the present disclosure. As shown in FIG. 5, a network node may communicate with multiple UEs. The network node may configure the UEs to assist with DPD training at the network node to reduce an effect of PA NL in signals transmitted by the network node.

As shown by reference number 505, a first UE may receive RSs from the network node. The RSs may include channel state information RSs (CSI-RSs) or other RSs used to measure an effect of PA NL.

As shown by reference number 510, the first UE may measure the PA NL based at least in part on the RSs. The first UE may measure a portion of the PA NL of the network node. For example, the first UE may measure the PA NL of a subset of PAs of the network node. Additionally, or alternatively, the first UE may measure the PA NL of the network node for a portion of a bandwidth used for transmission by the network node.

As shown by reference number 515, the first UE may transmit DPD information on first reporting resources.

As shown by reference number 520, a second UE may receive RSs from the network node. The RSs may include CSI-RSs or other RSs used to measure an effect of PA NL.

As shown by reference number 525, the second UE may measure the PA NL based at least in part on the RSs. The second UE may measure a portion of the PA NL of the network node. For example, the second UE may measure the PA NL of a subset of PAs of the network node. Additionally, or alternatively, the second UE may measure the PA NL of the network node for a portion of a bandwidth used for transmission by the network node.

As shown by reference number 530, the second UE may transmit DPD information on second reporting resources.

As shown by reference number 535, a third UE may receive RSs from the network node. The RSs may include CSI-RSs or other RSs used to measure an effect of PA NL.

As shown by reference number 540, the third UE may measure the PA NL based at least in part on the RSs. The third UE may measure a portion of the PA NL of the network node. For example, the third UE may measure the PA NL of a subset of PAs of the network node. Additionally, or alternatively, the third UE may measure the PA NL of the network node for a portion of a bandwidth used for transmission by the network node.

As shown by reference number 545, the third UE may transmit DPD information on third reporting resources.

Based at least in part on the first UE, the second UE, and the third UE using different resources for transmission of the DPD information, federated DPD with OTA signaling may consume network resources. In a network having dozens or hundreds of UEs connected to a network node, reporting the DPD information may use a prohibitive amount of resources. For example, the amount of resources may consume an amount of network resources that restricts an amount of resources available for control signaling and data signaling.

As indicated above, FIG. 5 is provided as an example. Other examples may differ from what is described with regard to FIG. 5.

To perform DPD training without an excessive cost of multiple feedback paths, the network node may train the DPD OTA with help of a UE. For example, the UE may calculate the PA non-linearity coefficients of the network node and signal them back to the network node. The DPD functionality in the network node is then configured based at least in part on the feedback from the UE.

In some networks, federated learning can be used to improve the DPD quality. With federated learning, the task of NL estimation and/or DPD estimation is divided among various UEs. Each UE sends an intermediate result of the calculation to network node. The network node aggregates the results and calculates a final set of DPD coefficients to apply to signals before transmitting. Federated learning may use an average of the NL model from multiple UEs to obtain a processing gain and/or may allow aggregation of results from multiple UE where each UE calculates on only a subset of the NL data (e.g., to conserve power and/or computing resources and/or capacity per UE and/or based at least in part on a limited bandwidth allocated to each UE), among other examples. However, a large number of communication resources are required for the feedback, especially if a large number of UEs are involved in the calculation, which is required to realize the benefits of federated learning in millimeter wave communications.

In federated learning, an overall OTA-DPD weighted least squares model to be solved by the network node may be:

$$\underset{g}{\mathrm{argmin}} \|w(Ag - y)\|^2$$

where: g is a non-linearity coefficients vector to be calculated (e.g., either the PA NL coefficients or directly the DPD coefficients), A is a matrix whose columns represent non-linear kernels and each row represents one equation (e.g., each row can represent time domain sample or frequency domain bin), y is a target vector where each element of y represents a target in one sample of either a time domain or a frequency domain. W is a weight diagonal matrix that may be configured for optimizing performance of different frequency regions. For example, the weight diagonal matrix may be used to optimize in-band distortions (e.g., error vector magnitude (EVM)) or out of band (e.g., adjacent channel leakage ratio (ACLR)). This can also represent weighting per UE when the set of equations is aggregated from multiple UEs and each UE experiences different signal-to-noise ratio (SNR).

For the case of federated learning, each UE works on a subset of the equations based on subset of w, A and y, such that the combined set of equations is $$\underset{g}{\mathrm{argmin}} \|w(Ag - y)\|^2 = \underset{g}{\mathrm{argmin}} \left\| \begin{bmatrix} w_0 & & \\ & \ddots & \\ & & w_{N-1} \end{bmatrix} \left( \begin{bmatrix} A_0 \\ \vdots \\ A_{N-1} \end{bmatrix} g - \begin{bmatrix} y_0 \\ \vdots \\ y_{N-1} \end{bmatrix} \right) \right\|^2$$

where the n-th UE builds an associated subset of equations based on $A_n$, $y_n$ & $w_n$ The solution to the aggregated set of equations:

$$g = (\Sigma_n A^H_n w_n A_n)^{-1} (\Sigma_n A^H_n w_n y_n)$$

is achieved as follows: each UE signals to the network node: $B_n = A^H_n w_n A_n$ and $z_n = A^H_n w_n y_n$, where $B_n$ is the expression, $z_n$ is a vector form of the expression.

The network node calculates: $g = (\Sigma_n v_n B_n)^{-1} (\Sigma_n v_n z_n)$, where $v_n$ is a scalar per UE that can represent a quality metric to the gNB (e.g. UE SNR).

The number of resources to feedback $B_n$ and $Z_n$ is $K^2$ (for B) & K (for z), respectively, where K is the number of NL kernels. Overall, the UEs may transmit $N(K^2+K)$ feedback signals which can be prohibitively large if the number of involved UEs N is large, as in millimeter wave networks.

In some aspects described herein, a network node and multiple UEs may perform combined DPD with OTA signaling with a reduced amount of overhead. In some aspects, feedback signals may be reduced by a factor of N by moving the part of the calculation to an OTA computation. A resulting OTA computation algorithm may include having each UE send $B_n$ and $z_n$ (e.g., as analog values, possibly quantized) using a same set of communication resources for all N UEs (e.g. same subcarriers in OFDM). Furthermore, each component may be scaled by a conjugate of a channel response so each UE sends $h_n^* B_n$ and $h_n^* Z_n$ where h is a conjugate of the channel response.

The network node receives a sum of the OTA feedback from the UEs, scaled by each UE channel response (e.g., $B = \Sigma_n h_n (h_n^* B_n) = \Sigma_n |h_n|^2 B_n$, $z = \Sigma_n h_n (h_n^* z_n) = \Sigma_n |h_n|^2 z_n$), and calculates $g = B^{-1} z$.

Scaling by $|h_n|^2$ may be equivalent to scaling by SNR. Determining $h_n$ may be known to the network node when, for example, there is channel reciprocity. The network node may use an approximation for $h_n$ to gain the performance benefits.

In some aspects, instead of scaling each transmission by $h_n^*$ the UE may scale by an angle (e.g., a UE-specific angle of a beam used to receive the RSs, a UE-specific angle of an estimated channel, and/or a scalar that does not include an amplitude), so that maximal power is extracted from each UE.

In some aspects, to improve robustness relative to noise, each UE may transmit M repetitions of the feedback. As long as M<<N, the techniques described reduce overhead and increase throughput for the network.

In some aspects, $B_n$ and $z_n$ may be decomposed arbitrarily to any linear combination of components that are identical in all UEs. Each component may be transmitted separately. In this way, the network node may receive a sum of each component from all UEs and calculate a linear combination of the components. This may restrict transmission to certain modulation orders under finite quantization of the feedback.

In some aspects, each UE may perform an entire calculation of the DPD coefficients by $g_n = B_n^{-1} z_n$ and send $h_n^* g_n$. The network node may receive the OTA calculated weighted average of all filters $g = \text{sum}(|h_n|^2 g_n)$. This may not be mathematically equivalent to previously described techniques, but may be effective for low SNR applications.

Based at least in part on having multiple UEs transmit DPD information and/or feedback using a same set of network resources, the network node may receive the DPD information that enables the network node to correct for PA NL without consuming a prohibitive amount of network resources.

Figure 6:
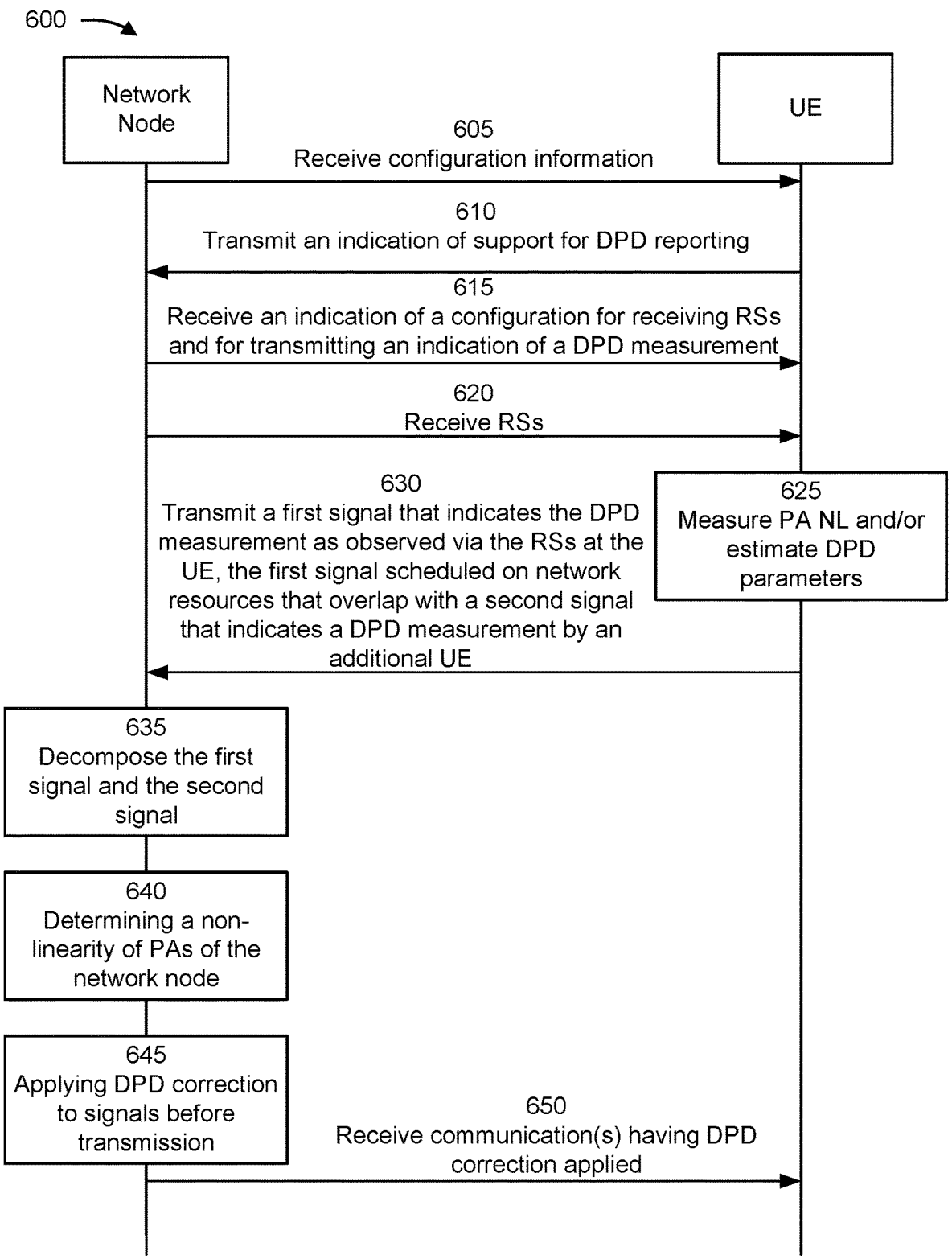
FIG. 6 is a diagram of an example associated with combined DPD with OTA signaling, in accordance with the present disclosure.

FIG. 6 is a diagram of an example 600 associated with combined DPD with OTA signaling, in accordance with the present disclosure. The combined DPD with OTA signaling may include federated DPD (e.g., using multiple UEs to assist in providing a network node with an estimated DPD function observed in transmissions of the network node). As shown in FIG. 6, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6. Although FIG. 6 illustrates a DPD with OTA signaling process with a single UE, the process is likely to be used with multiple UEs that are connected to the network node and that perform the same or similar operations described in connection with FIG. 6

As shown by reference number 605, the network node may transmit, and the UE may receive, configuration information. In some aspects, the UE may receive the configuration information via one or more of RRC signaling, one or more medium access control (MAC) control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit an indication of support for DPD reporting. In some aspects, the UE may report a bandwidth and/or an FR on which the UE supports measuring RSs to determine DPD information, such as PA NL.

The UE may configure itself based at least in part on the configuration information. In some aspects, the UE may be configured to perform one or more operations described herein based at least in part on the configuration information.

As shown by reference number 610, the UE may transmit, and the network node may receive, an indication of support for DPD reporting. For example, the UE may indicate that the UE report a bandwidth and/or an FR on which the UE supports measuring RSs to determine DPD information, such as PA NL.

As shown by reference number 615, the UE may receive, and the network node may transmit, an indication of a configuration for receiving RSs and for transmitting an indication of a DPD measurement. For example, the configuration may indicate resources on which the UE is to receive the RSs. Similarly, the configuration may indicate resources for transmitting the indication of the DPD measurement. In some aspects, the configuration may indicate a waveform of signaling the DPD measurement and/or information to include in the DPD reporting. In some aspects, the configuration may indicate a formula to be used to calculate the information to include in the DPD reporting (e.g., an equation, whether to use a scalar, whether to report the DPD information in components or in full, and/or whether to perform calculations on the DPD measurement, among other examples).

As shown by reference number 620, the UE may receive, and the network node may transmit the RSs. In some aspects, the RSs may include CSI-RSs tracking reference signals (TRSs) or other RSs that can be measured to detect PA NL or other DPD information. In some aspects, the RSs may be associated with a control message that is UE-specific, beam-specific, or cell-specific, among other examples. For example, the control message may schedule the RSs for individual UEs, for all UEs on a beam, or for all UEs in a cell, among other examples. In some aspects, the control message may indicate instructions for DPD calculations. For example, the UE may be instructed to place more emphasis on suppression of out of band emissions than in-band emissions. In some aspects, the UE may be instructed with different emphases using a weights matrix for applying to observed DPD.

As shown by reference number 625, the UE may measure NL PA and/or estimate DPD parameters. In some aspects, the DPD measurement includes an estimation of PA NL coefficients. The estimation of the PA NL coefficients may be based at least in part on measurement of the RSs at the UE.

As shown by reference number 630, the UE may transmit a first signal that indicates the DPD measurement as observed via the RSs at the UE. In some aspects, the first signal may be scheduled on network resources that overlap with a second signal that indicates a DPD measurement by an additional UE. In some aspects, the UE may be allocated resources that overlap (e.g., partially or fully) with resources allocated for other UEs to transmit signals that indicate the DPD measurement.

In some aspects, the first signal and the second signal may be configured for coherent combination (e.g., additive signaling based at least in part on signaling a same or nearly same signal from multiple devices). For example, each of the UEs may have a same modulation and coding scheme for transmitting the signals. In some aspects, the first signal may be configured for coherent combination OTA with the second signal based at least in part on the first signal including analog values of the DPD measurement and/or quantized values of the DPD measurement. In some aspects, the first signal and the second signal may be configured for coherent combining based at least in part on each signaling being pre-multiplied by a corresponding channel response and/or a channel response phase, among other examples.

In some aspects, each of the UEs may apply a scalar or other operator to the signals before transmitting such that the network node can decompose the signals when received. In some aspects, the scalar multiplier of the DPD measurement is based at least in part on one or more of a channel response as observed via the RSs or an angle of an estimated channel, among other examples. For example, the UE may use a beam to receive a signal (e.g., the RSs). The signal, through the UE beam, has an angle compared to (e.g., relative to) an original transmitted signal. The angle compared to the original transmitted signal may be described as the angle of the estimated channel (e.g., an angle associated with the estimated channel).

In some aspects, the UE, the second UE, and/or one or more additional UEs may transmit the signals (e.g., a combined signal) with one or more repetitions. In some aspects, a number of repetitions is less than a number of the UEs transmitting the signals. Based at least in part on using repetitions, the network node has improved signal strength and/or the network node may estimate the PA NL and/or DPD with improved accuracy.

In some aspects, the signal may include an indication of a matrix associated with the DPD measurement or the signal may include indications of components of the matrix associated with the DPD measurement. For example, the signal may indicate a full measurement of the DPD as measured over an entire bandwidth allocated for the RSs, or the signal may indicate the DPD as measured over different portions of the bandwidth.

In some aspects, the signal may include an indication of a quantized value of a partitioned component of the DPD measurement. For example, the signal may indicate a first portion of the DPD measurement and an additional signal transmitted by the UE may indicate a second portion of the DPD measurement. For example, the first portion of the DPD measurement may be a value (e.g., matrix) A, and the second portion of the DPD measurement may be a value (e.g., matrix) B. The value A (e.g., with possible variations) may transmit transmitted by multiple UEs and may be coherently combined OTA. Similarly (e.g., in transmissions using a different time resource), the value B e.g., with possible variations) may transmit transmitted by multiple UEs and may be coherently combined OTA. In some aspects, A and/or B may be quantized values. In some aspects, the values A and/or B may be associated with scaling factors (e.g., pre-known to the UEs and the network node) to A and B such that a signal C (e.g., carrying the entire DPD measurement as a quantized value) may be equal to a*A+b*B. The network node may identify C based at least in part on receiving indications of A and applying the scaling factor a to A, and receiving indications of B and applying the scaling factor b to B.

In some aspects, the signal may include an indication of PA NL coefficients as calculated based at least in part on the DPD effect measured via the RSs, or may include indications of DPD coefficients as measured based at least in part on the RSs.

As shown by reference number 635, the network node may decompose the first signal and the second signal. For example, the network node may decompose a combined signal into components and may use a sum (e.g., a weighted sum) as received over-the-air for DPD calculations. In some aspects, the network node may decompose the first signal and the second signal from a combined signal on the same set of resources based at least in part on the signals being transmitted with different scalar multiples applied.

As shown by reference number 640, the network node may determine NL of PAs of the network node based at least in part on the first signal and the second signal. In some aspects, the network node may determine the NL of the PAs based at least in part on aggregating signals indicating DPD measurements by multiple UEs connected to the network node.

As shown by reference number 645, the network node may apply DPD correction to signals before transmission. For example, the network node may apply power modifications to different subcarriers and/or PAs to compensate for PA NLs as observed by UEs in communication with the network node.

As shown by reference number 650, the UE may receive, and the network node may transmit, communications having DPD correction applied. In this way, the network node and the UE may communicate with reduce communication errors, with improved coverage and/or signal strengths, improved spectral efficiencies and/or higher MCSs without using a prohibitive amount of resources to communicate DPD measurements.

As indicated above, FIG. 6 is provided as an example. Other examples may differ from what is described with respect to FIG. 6.

Figure 7:
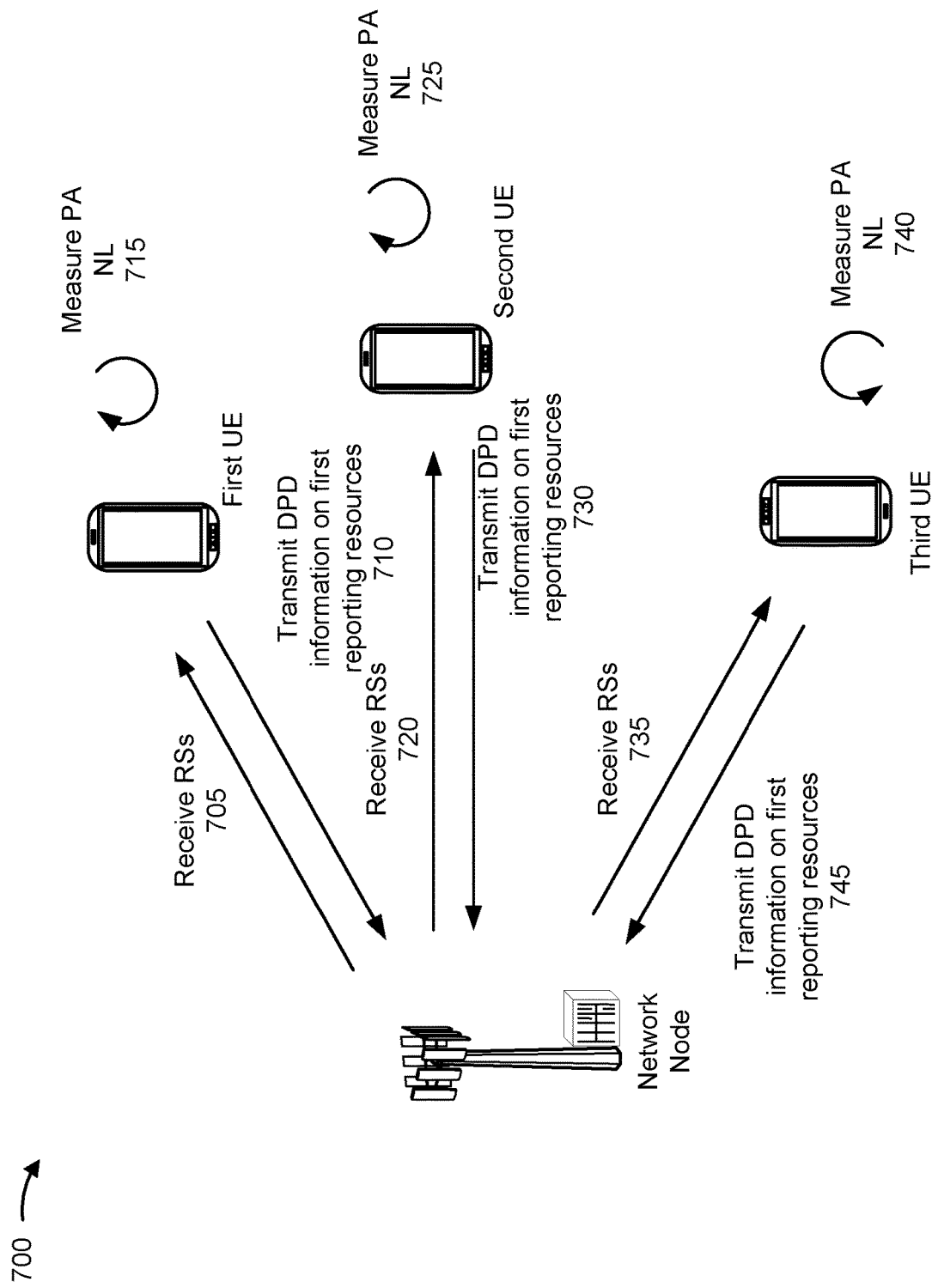
FIG. 7 is a diagram of an example associated with combined DPD with OTA signaling, in accordance with the present disclosure.

FIG. 7 is a diagram of an example 700 associated with combined DPD with OTA signaling, in accordance with the present disclosure. As shown in FIG. 7, a network node may communicate with multiple UEs. The network node may configure the UEs to assist with DPD training at the network node to reduce an effect of PA NL in signals transmitted by the network node.

As shown by reference number 705, a first UE may receive RSs from the network node. The RSs may include CSI-RSs or other RSs used to measure an effect of PA NL.

As shown by reference number 710, the first UE may measure the PA NL based at least in part on the RSs. The first UE may measure a portion of the PA NL of the network node. For example, the first UE may measure the PA NL of a subset of PAs of the network node. Additionally, or alternatively, the first UE may measure the PA NL of the network node for a portion of a bandwidth used for transmission by the network node. In some aspects, the first UE may perform one or more operations on measurements of the PA NL. For example, the first UE may determine DPD coefficients and/or PA NL coefficients to report back to the network node.

As shown by reference number 715, the first UE may transmit DPD information on first reporting resources. In some aspects, the first UE may use reporting resources indicated along with resources allocated to receiving the RSs. In some aspects, the first UE may receive an allocation of the first reporting resources in a message that is also transmitted to the second UE and the third UE.

As shown by reference number 720, a second UE may receive RSs from the network node. The RSs may include CSI-RSs or other RSs used to measure an effect of PA NL.

As shown by reference number 725, the second UE may measure the PA NL based at least in part on the RSs. The second UE may measure a portion of the PA NL of the network node. For example, the second UE may measure the PA NL of a subset of PAs of the network node. Additionally, or alternatively, the second UE may measure the PA NL of the network node for a portion of a bandwidth used for transmission by the network node. In some aspects, the second UE may perform one or more operations on measurements of the PA NL. For example, the second UE may determine DPD coefficients and/or PA NL coefficients to report back to the network node.

As shown by reference number 730, the second UE may transmit DPD information on the first reporting resources (the same or overlapping resources as used by the first UE). In some aspects, the second UE may use reporting resources indicated along with resources allocated to receiving the RSs.

As shown by reference number 735, a third UE may receive RSs from the network node. The RSs may include CSI-RSs or other RSs used to measure an effect of PA NL.

As shown by reference number 740, the third UE may measure the PA NL based at least in part on the RSs. The third UE may measure a portion of the PA NL of the network node. For example, the third UE may measure the PA NL of a subset of PAs of the network node. Additionally, or alternatively, the third UE may measure the PA NL of the network node for a portion of a bandwidth used for transmission by the network node. In some aspects, the third UE may perform one or more operations on measurements of the PA NL. For example, the third UE may determine DPD coefficients and/or PA NL coefficients to report back to the network node.

As shown by reference number 745, the third UE may transmit DPD information on the first reporting resources (the same or overlapping resources as used by the first UE). In some aspects, the third may UE use reporting resources indicated along with resources allocated to receiving the RSs.

Based at least in part on the first UE, the second UE, and the third UE using the same resources for transmission of the DPD information, federated DPD with OTA signaling may conserve network resources that may have otherwise been used to transmit the DPD information on different resources. In a network having dozens or hundreds of UEs connected to a network node, reporting the DPD information may not use prohibitive amount of resources based at least in part on the resources at least partially overlapping.

As indicated above, FIG. 7 is provided as an example. Other examples may differ from what is described with regard to FIG. 7.

Figure 8:
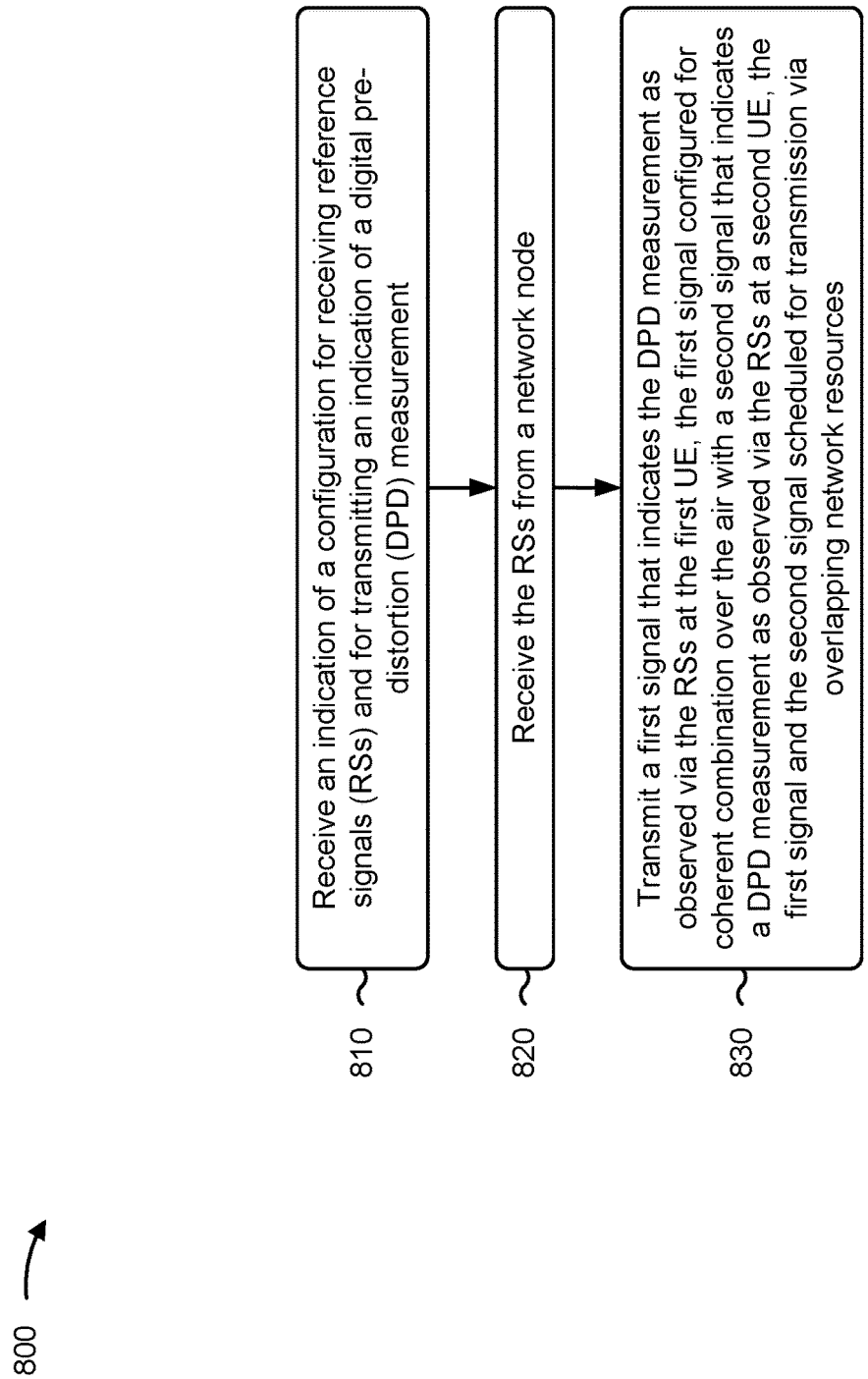
FIG. 8 is a diagram illustrating an example process performed, for example, by a first UE, in accordance with the present disclosure.

FIG. 8 is a diagram illustrating an example process 800 performed, for example, by a first UE, in accordance with the present disclosure. Example process 800 is an example where the UE (e.g., UE 120) performs operations associated with techniques for combined DPD with OTA signaling.

As shown in FIG. 8, in some aspects, process 800 may include receiving an indication of a configuration for receiving RSs and for transmitting an indication of a DPD measurement (block 810). For example, the UE (e.g., using communication manager 140 and/or reception component 1002, depicted in FIG. 10) may receive an indication of a configuration for receiving RSs and for transmitting an indication of a DPD measurement, as described above.

As further shown in FIG. 8, in some aspects, process 800 may include receiving the RSs from a network node (block 820). For example, the UE (e.g., using communication manager 140 and/or reception component 1002, depicted in FIG. 10) may receive the RSs from a network node, as described above.

As further shown in FIG. 8, in some aspects, process 800 may include transmitting a first signal that indicates the DPD measurement as observed via the RSs at the first UE, the first signal configured for coherent combination OTA with a second signal that indicates a DPD measurement as observed via the RSs at a second UE, the first signal and the second signal scheduled for transmission via overlapping network resources (block 830). For example, the UE (e.g., using communication manager 140 and/or transmission component 1004, depicted in FIG. 10) may transmit a first signal that indicates the DPD measurement as observed via the RSs at the first UE, the first signal configured for coherent combination OTA with a second signal that indicates a DPD measurement as observed via the RSs at a second UE, the first signal and the second signal scheduled for transmission via overlapping network resources, as described above.

Process 800 may include additional aspects, such as any single aspect or any combination of aspects described below and/or in connection with one or more other processes described elsewhere herein.

In a first aspect, the DPD measurement comprises an estimation of power amplifier non-linearity coefficients based at least in part on measurement of the RSs at the UE.

In a second aspect, alone or in combination with the first aspect, the RSs are associated with a control message that is one or more of UE-specific, beam-specific, or cell-specific.

In a third aspect, alone or in combination with one or more of the first and second aspects, the first signal is configured for coherent combination OTA with the second signal based at least in part on the overlapping resources being fully overlapping resources.

In a fourth aspect, alone or in combination with one or more of the first through third aspects, the first signal is configured for coherent combination OTA with the second signal based at least in part on the first signal comprising values of the DPD measurement, quantizing values of the DPD measurement, or a scalar multiplier of the DPD measurement.

In a fifth aspect, alone or in combination with one or more of the first through fourth aspects, the scalar multiplier of the DPD measurement is based at least in part on one or more of a channel response as observed via the RSs or angle associated with an estimated channel.

In a sixth aspect, alone or in combination with one or more of the first through fifth aspects, transmission of the first signal comprises transmitting one or more repetitions of the first signal.

In a seventh aspect, alone or in combination with one or more of the first through sixth aspects, the first signal comprises an indication of a matrix associated with the DPD measurement, or indications of components of the matrix associated with the DPD measurement.

In an eighth aspect, alone or in combination with one or more of the first through seventh aspects, the first signal comprises an indication of power amplifier non-linearity coefficients, or an indication of DPD coefficients.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
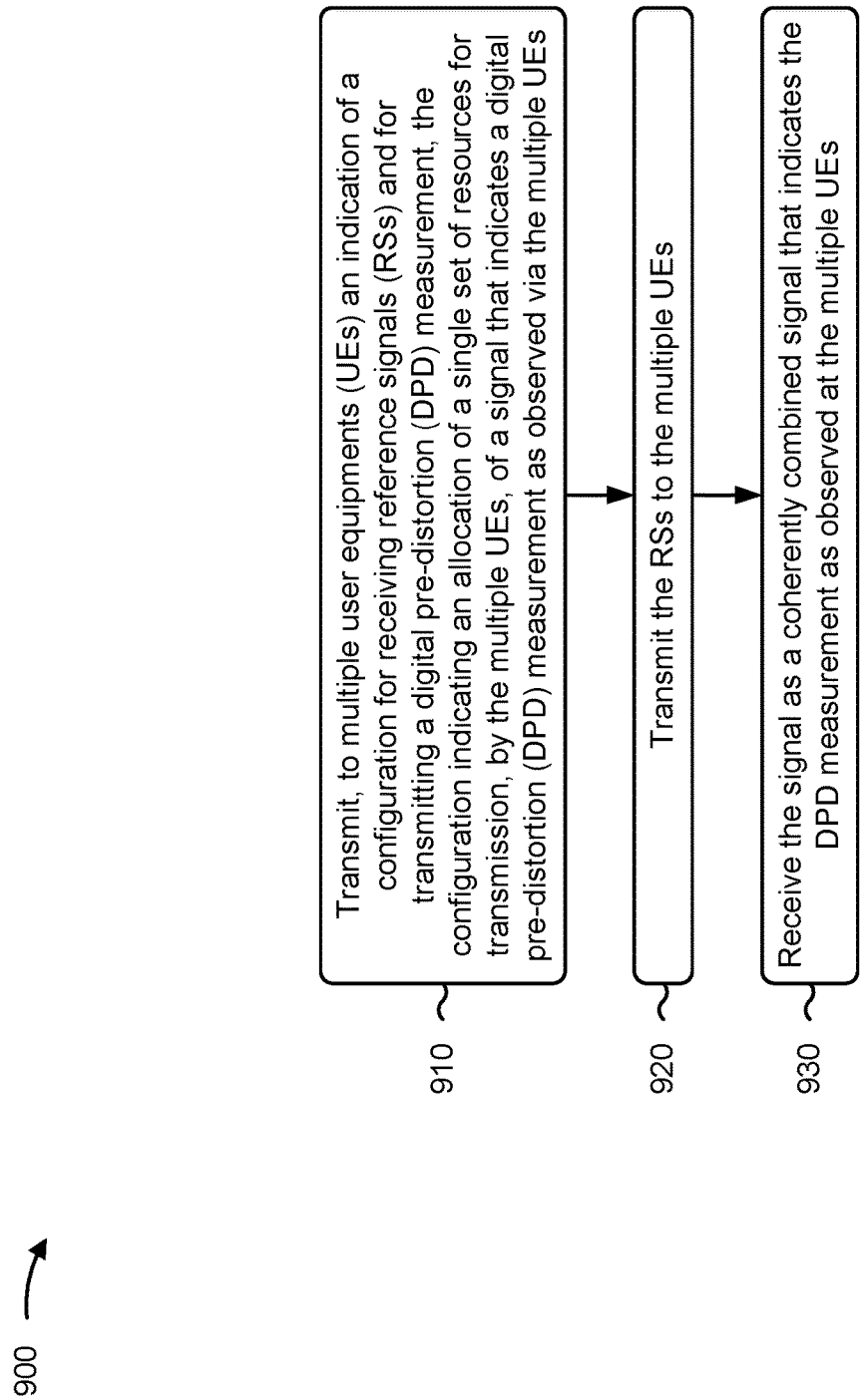
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with techniques for combined DPD with OTA signaling.

As shown in FIG. 9, in some aspects, process 900 may include transmitting, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs (block 910). For example, the network node (e.g., using communication manager 150 and/or transmission component 1104, depicted in FIG. 11) may transmit, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs, as described above.

As further shown in FIG. 9, in some aspects, process 900 may include transmitting the RSs to the multiple UEs (block 920). For example, the network node (e.g., using communication manager 150 and/or transmission component 1104, depicted in FIG. 11) may transmit the RSs to the multiple UEs, as described above.

As further shown in FIG. 9, in some aspects, process 900 may include receiving the signal as a coherently combined signal that indicates the DPD measurement as observed at the multiple UEs (block 930). For example, the network node (e.g., using communication manager 150 and/or reception component 1102, depicted in FIG. 11) may receive the signal as a coherently combined signal that indicates the DPD measurement as observed at the multiple UEs, as described above.

Process 900 may include additional aspects, such as any single aspect or any combination of aspects described below and/or in connection with one or more other processes described elsewhere herein.

In a first aspect, the DPD measurement comprises an estimation of power amplifier non-linearity coefficients based at least in part on measurement of the RSs at the multiple UEs.

In a second aspect, alone or in combination with the first aspect, the RSs are associated with a control message that is one or more of UE-specific, beam-specific, or cell-specific.

In a third aspect, alone or in combination with one or more of the first and second aspects, the signal is configured for coherent combination OTA based at least in part on the signal comprising values of the DPD measurement, quantizing values of the DPD measurement, or UE-specific scalar multipliers of the DPD measurement.

In a fourth aspect, alone or in combination with one or more of the first through third aspects, the UE-specific scalar multipliers of the DPD measurement is based at least in part on one or more of a UE-specific channel response as observed via the RSs or an angle associated with an estimated channel.

In a fifth aspect, alone or in combination with one or more of the first through fourth aspects, reception of the signal comprises receiving one or more repetitions of the signal.

In a sixth aspect, alone or in combination with one or more of the first through fifth aspects, the signal comprises an indication of a matrix associated with the DPD measurement, or indications of components of the matrix associated with the DPD measurement.

In a seventh aspect, alone or in combination with one or more of the first through sixth aspects, receiving the signal comprises calculating a linear combination of the components of the matrix associated with the DPD measurement, calculating a weighted average of elements of the signal.

In an eighth aspect, alone or in combination with one or more of the first through seventh aspects, the signal comprises an indication of power amplifier non-linearity coefficients, or an indication of DPD coefficients.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
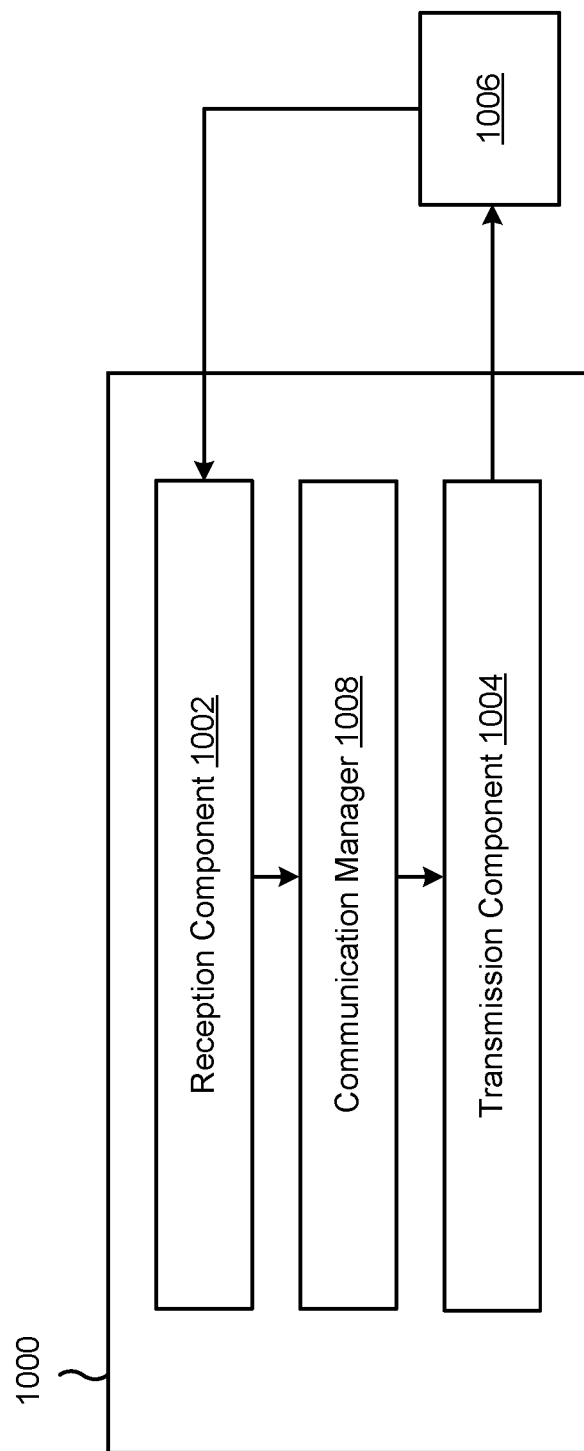
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive an indication of a configuration for receiving RSs and for transmitting an indication of a DPD measurement. The reception component 1002 may receive the RSs from a network node. The transmission component 1004 may transmit a first signal that indicates the DPD measurement as observed via the RSs at the first UE, the first signal configured for coherent combination OTA with a second signal that indicates a DPD measurement as observed via the RSs at a second UE, the first signal and the second signal scheduled for transmission via overlapping network resources.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
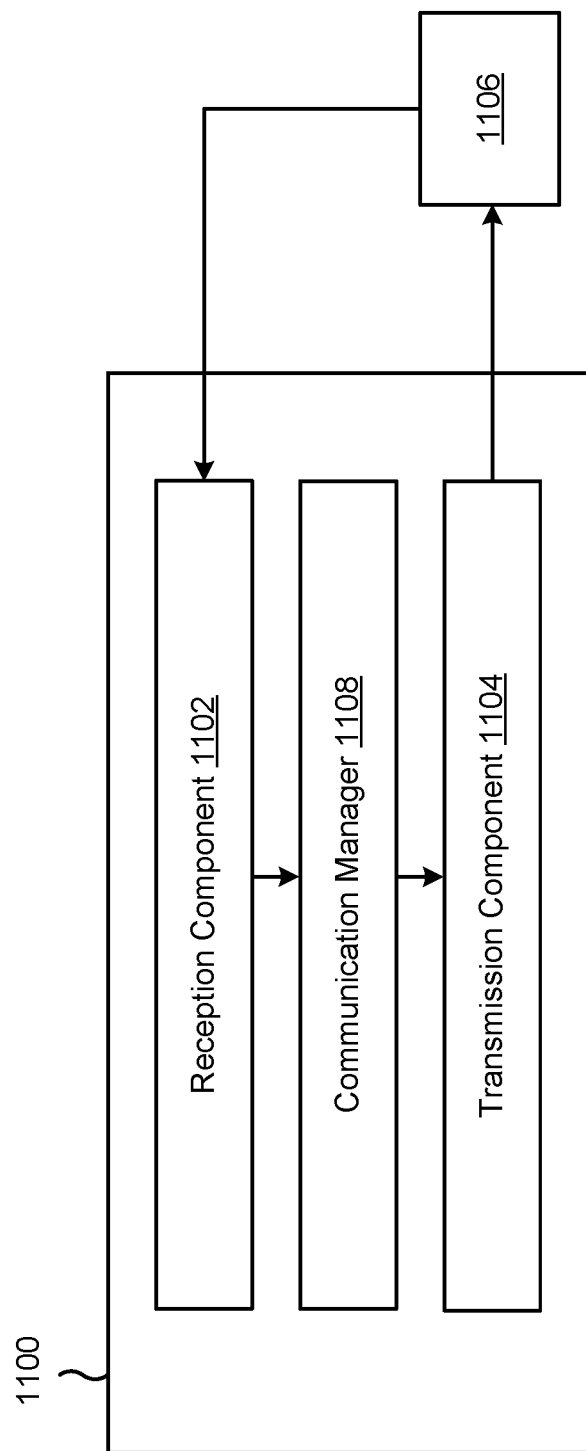
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit, to multiple UEs an indication of a configuration for receiving RSs and for transmitting a DPD measurement, the configuration indicating an allocation of a single set of resources for transmission, by the multiple UEs, of a signal that indicates a DPD measurement as observed via the multiple UEs. The transmission component 1104 may transmit the RSs to the multiple UEs. The reception component 1102 may receive the signal as a coherently combined signal that indicates the DPD measurement as observed at the multiple UEs.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: receiving an indication of a configuration for receiving reference signals (RSs) and for transmitting an indication of a digital pre-distortion (DPD) measurement; receiving the RSs from a network node; and transmitting a first signal that indicates the DPD measurement as observed via the RSs at the first UE, the first signal configured for coherent combination over the air with a second signal that indicates a DPD measurement as observed via the RSs at a second UE, the first signal and the second signal scheduled for transmission via overlapping network resources.

Aspect 2: The method of Aspect 1, wherein the DPD measurement comprises: an estimation of power amplifier non-linearity coefficients based at least in part on measurement of the RSs at the UE.

Aspect 3: The method of any of Aspects 1-2, wherein the RSs are associated with a control message that is one or more of: UE-specific, beam-specific, or cell-specific.

Aspect 4: The method of any of Aspects 1-3, wherein the first signal is configured for coherent combination over the air with the second signal based at least in part on the overlapping resources being fully overlapping resources.

Aspect 5: The method of any of Aspects 1-4, wherein the first signal is configured for coherent combination over the air with the second signal based at least in part on the first signal comprising: analog values of the DPD measurement, quantized values of the DPD measurement, or a scalar multiplier of the DPD measurement.

Aspect 6: The method of Aspect 5, wherein the scalar multiplier of the DPD measurement is based at least in part on one or more of: a channel response as observed via the RSs or an angle associated with an estimated channel.

Aspect 7: The method of any of Aspects 1-6, wherein transmission of the first signal comprises: transmitting one or more repetitions of the first signal.

Aspect 8: The method of any of Aspects 1-7, wherein the first signal comprises: an indication of a matrix associated with the DPD measurement, or indications of components of the matrix associated with the DPD measurement.

Aspect 9: The method of any of Aspects 1-8, wherein the first signal comprises: an indication of power amplifier non-linearity coefficients, or an indication of DPD coefficients.

Aspect 10: A method of wireless communication performed by a network node, comprising: transmitting, to multiple user equipments (UEs) an indication of a configuration for receiving reference signals (RSs) and for transmitting a digital pre-distortion (DPD) measurement, the configuration indicating an allocation of a single set of resources for transmission, by the multiple UEs, of a signal that indicates a digital pre-distortion (DPD) measurement as observed via the multiple UEs; transmitting the RSs to the multiple UEs; and receiving the signal as a coherently combined signal that indicates the DPD measurement as observed at the multiple UEs.

Aspect 11: The method of Aspect 10, wherein the DPD measurement comprises: an estimation of power amplifier non-linearity coefficients based at least in part on measurement of the RSs at the multiple UEs.

Aspect 12: The method of any of Aspects 10-11, wherein the RSs are associated with a control message that is one or more of: UE-specific, beam-specific, or cell-specific.

Aspect 13: The method of any of Aspects 1-12, wherein the signal is configured for coherent combination over the air based at least in part on the signal comprising: analog values of the DPD measurement, quantized values of the DPD measurement, or UE-specific scalar multipliers of the DPD measurement.

Aspect 14: The method of Aspect 13, wherein the UE-specific scalar multipliers of the DPD measurement is based at least in part on one or more of: a UE-specific channel response as observed via the RSs or an angle associated with an estimated channel.

Aspect 15: The method of any of Aspects 1-14, wherein reception of the signal comprises: receiving one or more repetitions of the signal.

Aspect 16: The method of any of Aspects 1-15, wherein the signal comprises: an indication of a matrix associated with the DPD measurement, or indications of components of the matrix associated with the DPD measurement.

Aspect 17: The method of Aspect 16, wherein receiving the signal comprises: calculating a linear combination of the components of the matrix associated with the DPD measurement, calculating a weighted average of elements of the signal.

Aspect 18: The method of any of Aspects 1-17, wherein the signal comprises: an indication of power amplifier non-linearity coefficients, or an indication of DPD coefficients.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a first user equipment (UE), comprising:
   receiving an indication of a configuration for receiving reference signals (RSs) and for transmitting an indication of a digital pre-distortion (DPD) measurement;
   receiving the RSs from a network node; and
   transmitting a first signal that indicates the DPD measurement as observed via the RSs at the first UE, the first signal configured for coherent combination over the air with a second signal that indicates a DPD measurement as observed via the RSs at a second UE, the first signal and the second signal scheduled for transmission via overlapping network resources.

2. The method of claim 1, wherein the DPD measurement comprises:
   an estimation of power amplifier non-linearity coefficients based at least in part on measurement of the RSs at the first UE.

3. The method of claim 1, wherein the RSs are associated with a control message that is one or more of:
   UE-specific,
   beam-specific, or
   cell-specific.

4. The method of claim 1, wherein the first signal is configured for coherent combination over the air with the second signal based at least in part on the overlapping resources being fully overlapping resources.

5. The method of claim 1, wherein the first signal is configured for coherent combination over the air with the second signal based at least in part on the first signal comprising:
   analog values of the DPD measurement,
   quantized values of the DPD measurement, or
   a scalar multiplier of the DPD measurement.

6. The method of claim 5, wherein the scalar multiplier of the DPD measurement is based at least in part on one or more of:
   a channel response as observed via the RSs, or
   an angle associated with an estimated channel.

7. The method of claim 1, wherein transmission of the first signal comprises:
   transmitting one or more repetitions of the first signal.

8. The method of claim 1, wherein the first signal comprises:
   an indication of a matrix associated with the DPD measurement,
   indications of components of the matrix associated with the DPD measurement, or
   an indication of a quantized value of a partitioned component of the DPD measurement.

9. The method of claim 1, wherein the first signal comprises:
   an indication of power amplifier non-linearity coefficients, or
   an indication of DPD coefficients.

10. A method of wireless communication performed by a network node, comprising:
    transmitting, to multiple user equipments (UEs) an indication of a configuration for receiving reference signals (RSs) and for transmitting a digital pre-distortion (DPD) measurement, the configuration indicating an allocation of a single set of resources for transmission, by the multiple UEs, of a signal that indicates a digital pre-distortion (DPD) measurement as observed via the multiple UEs;
    transmitting the RSs to the multiple UEs; and
    receiving the signal as a coherently combined signal that indicates the DPD measurement as observed at the multiple UEs.

11. The method of claim 10, wherein the DPD measurement comprises:
    an estimation of power amplifier non-linearity coefficients based at least in part on measurement of the RSs at the multiple UEs.

12. The method of claim 10, wherein the RSs are associated with a control message that is one or more of:
    UE-specific,
    beam-specific, or
    cell-specific.

13. The method of claim 10, wherein the signal is configured for coherent combination over the air based at least in part on the signal comprising:
    analog values of the DPD measurement,
    quantized values of the DPD measurement, or
    UE-specific scalar multipliers of the DPD measurement.

14. The method of claim 13, wherein the UE-specific scalar multipliers of the DPD measurement is based at least in part on one or more of:
    a UE-specific channel response as observed via the RSS,
    a UE-specific angle of a beam used to receive the RSs, or
    an angle associated with an estimated channel.

15. The method of claim 10, wherein reception of the signal comprises:
    receiving one or more repetitions of the signal.

16. The method of claim 10, wherein the signal comprises:
    an indication of a matrix associated with the DPD measurement, or
    indications of components of the matrix associated with the DPD measurement.

17. The method of claim 16, wherein receiving the signal comprises:
    calculating a linear combination of the components of the matrix associated with the DPD measurement,
    calculating a weighted average of elements of the signal.

18. The method of claim 10, wherein the signal comprises:
    an indication of power amplifier non-linearity coefficients, or
    an indication of DPD coefficients.

19. A first user equipment (UE) for wireless communication, comprising:
    a memory; and
    one or more processors, coupled to the memory, configured to:
      receive an indication of a configuration for receiving reference signals (RSs) and for transmitting an indication of a digital pre-distortion (DPD) measurement;
      receive the RSs from a network node; and
      transmit a first signal that indicates the DPD measurement as observed via the RSs at the first UE, the first signal configured for coherent combination over the air with a second signal that indicates a DPD measurement as observed via the RSs at a second UE, the first signal and the second signal scheduled for transmission via overlapping network resources.

20. The UE of claim 19, wherein the DPD measurement comprises:
    an estimation of power amplifier non-linearity coefficients based at least in part on measurement of the RSs at the first UE.

21. The UE of claim 19, wherein the RSs are associated with a control message that is one or more of:
    UE-specific,
    beam-specific, or
    cell-specific.

22. The UE of claim 19, wherein the first signal is configured for coherent combination over the air with the second signal based at least in part on the overlapping resources being fully overlapping resources.

23. The UE of claim 19, wherein the first signal is configured for coherent combination over the air with the second signal based at least in part on the first signal comprising:
    values of the DPD measurement,
    quantized values of the DPD measurement, or
    a scalar multiplier of the DPD measurement.

24. The UE of claim 23, wherein the scalar multiplier of the DPD measurement is based at least in part on one or more of:
    a channel response as observed via the RSs,
    an angle of a beam used to receive the RSs, or
    an angle associated with an estimated channel.

25. The UE of claim 19, wherein the first signal comprises:
    an indication of power amplifier non-linearity coefficients, or
    an indication of DPD coefficients.

26. A network node for wireless communication, comprising:
    a memory; and
    one or more processors, coupled to the memory, configured to:
      transmit, to multiple user equipments (UEs) an indication of a configuration for receiving reference signals (RSs) and for transmitting a digital pre-distortion (DPD) measurement, the configuration indicating an allocation of a single set of resources for transmission, by the multiple UEs, of a signal that indicates a digital pre-distortion (DPD) measurement as observed via the multiple UEs;

transmit the RSs to the multiple UEs; and
receive the signal as a coherently combined signal that indicates the DPD measurement as observed at the multiple UEs.

27. The network node of claim 26, wherein the DPD measurement comprises:
an estimation of power amplifier non-linearity coefficients based at least in part on measurement of the RSs at the multiple UEs.

28. The network node of claim 26, wherein the RSs are associated with a control message that is one or more of:
UE-specific,
beam-specific, or
cell-specific.

29. The network node of claim 26, wherein the signal is configured for coherent combination over the air based at least in part on the signal comprising:
values of the DPD measurement,
quantized values of the DPD measurement, or
UE-specific scalar multipliers of the DPD measurement.

30. The network node of claim 26, wherein the one or more processors, to receive the signal, are configured to:
calculate a linear combination of components of a matrix associated with the DPD measurement,
calculate a weighted average of elements of the signal.

* * * * *